(12) United States Patent
Devereaux

(10) Patent No.: US 6,474,435 B1
(45) Date of Patent: Nov. 5, 2002

(54) MEANS FOR ELECTRICAL CONNECTION OF COMPONENTS IN A VEHICLE OCCUPANT PROTECTION SYSTEM

(75) Inventor: Scott D. Devereaux, Armada, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/657,073

(22) Filed: Sep. 7, 2000

(51) Int. Cl.[7] ............................................... B60R 21/00
(52) U.S. Cl. ........................ 180/270; 24/633; 280/801.1
(58) Field of Search .............................. 280/801.1, 802; 180/270, 286; 24/633

(56) References Cited

U.S. PATENT DOCUMENTS

| | | |
|---|---|---|
| 2,127,648 A | 8/1938 | Mehlhouse |
| 2,388,242 A | 11/1945 | Arndt, Jr. |
| 3,443,055 A | 5/1969 | Gwynn et al. |
| 4,084,307 A | 4/1978 | Shultz et al. |
| 4,441,006 A | 4/1984 | Machida et al. |
| 4,640,982 A | 2/1987 | Kasper et al. |
| 4,659,898 A | 4/1987 | Spiegelmann et al. |
| 5,063,279 A | 11/1991 | Rossi |
| 5,163,221 A | 11/1992 | Favre-Tissot et al. |
| 5,191,710 A | 3/1993 | Fujimaki et al. |
| 5,371,335 A | 12/1994 | McKeon et al. |
| 5,393,951 A | 2/1995 | Kasper |
| 5,438,492 A * | 8/1995 | Collins et al. ............... 362/108 |
| 5,484,976 A | 1/1996 | Shalchiero et al. |
| 5,493,069 A * | 2/1996 | Conti ........................... 174/90 |
| 5,593,604 A | 1/1997 | Beasley et al. |
| 5,712,462 A | 1/1998 | Berkowitz et al. |
| 5,742,986 A * | 4/1998 | Corrion et al. ................ 24/633 |
| 5,898,366 A * | 4/1999 | Brown et al. ............. 340/457.1 |
| 5,977,508 A | 11/1999 | Takano |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A vehicle occupant protection system (10) includes a seat belt buckle (12) for receiving a seat belt tongue (16). A Hall effect device (62) is mounted on the seat belt buckle (12). The Hall effect device (62) has at least one electrical lead (72, 74). A magnet (68) is mounted on the seat belt buckle (12). The magnet (68) and the Hall effect device (62) are moveable relative to each other to first relative positions upon receipt of the seat belt tongue (16) in the seat belt buckle (12). The Hall effect device (62) provides a signal in response to the magnet (68) and the Hall effect device (62) being moved to the first relative positions. An electrical conductor (92, 94) has an electrical connection (110, 114) with the electrical lead (72, 74). The electrical connection (110, 114) is provided by melted portions (112, 116) of the electrical lead (72, 74) and the electrical conductor (92, 94) that are bonded together.

7 Claims, 3 Drawing Sheets

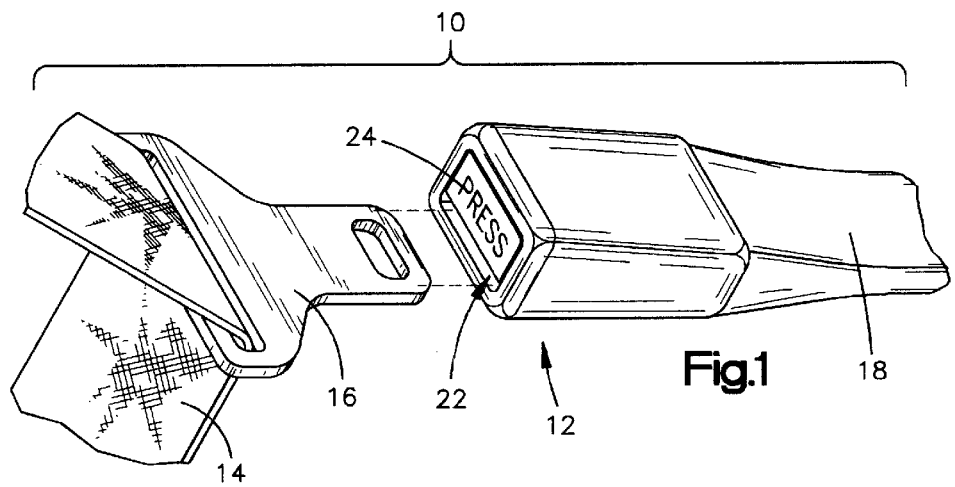
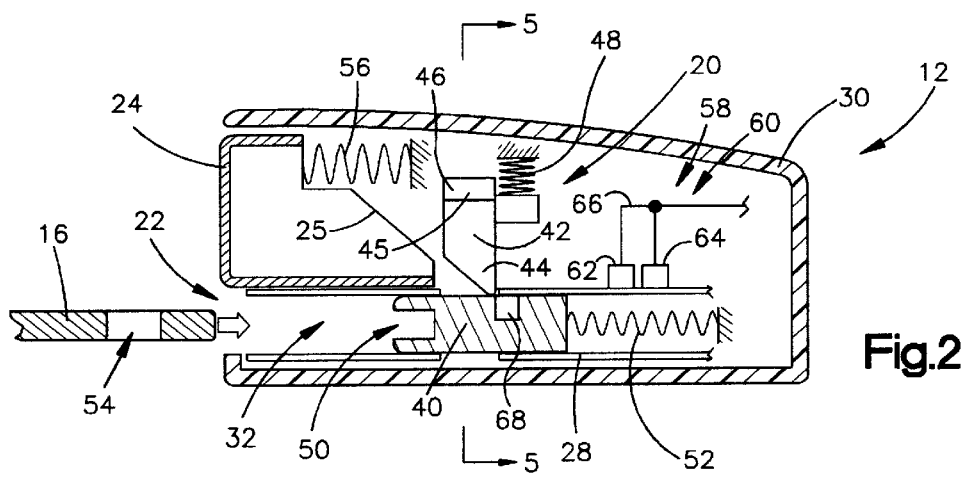
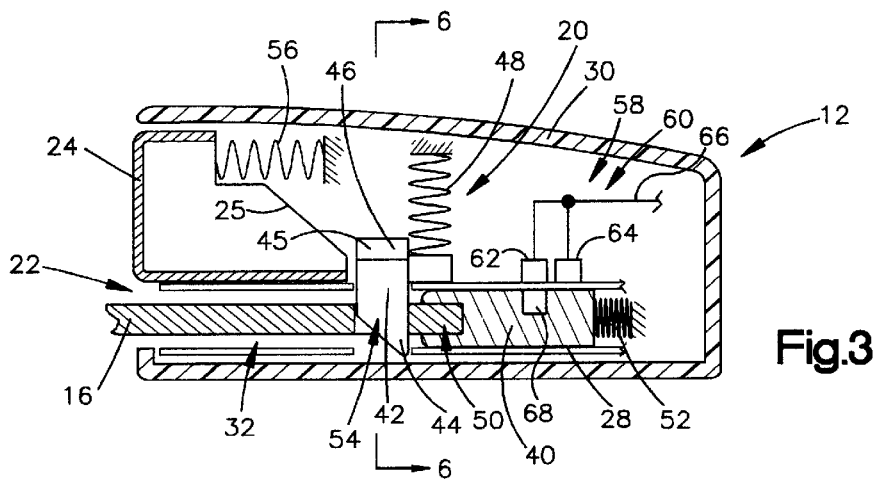

MEANS FOR ELECTRICAL CONNECTION OF COMPONENTS IN A VEHICLE OCCUPANT PROTECTION SYSTEM

FIELD OF THE INVENTION

The present invention relates to a vehicle occupant protection system. In particular, the present invention relates to means for providing an electrical connection between electrical components in a vehicle occupant protection system.

BACKGROUND OF THE INVENTION

It is known to provide a vehicle occupant protection system in a vehicle. One such vehicle occupant protection system is a seat belt for restraining a vehicle occupant. Such seat belts typically include seat belt webbing, a seat belt tongue on the webbing, and a seat belt buckle. The seat belt tongue is inserted in the buckle when the webbing has been placed about a vehicle occupant. A latch mechanism in the buckle interlocks with the seat belt tongue to secure the webbing about the occupant. The seat belt system may also include a sensor for indicating whether or not the seat belt tongue is locked in the buckle. Such a sensor may include electrically connected electrical components that provide such indication.

SUMMARY OF THE INVENTION

The present invention relates to a vehicle occupant protection system that comprises a seat belt buckle for receiving a seat belt tongue. A Hall effect device is mounted on the seat belt buckle. The Hall effect device has at least one electrical lead. A magnet is mounted on the seat belt buckle. The magnet and the Hall effect device are moveable relative to each other to first relative positions upon receipt of the seat belt tongue in the seat belt buckle. The Hall effect device provides a signal in response to the magnet and the Hall effect device being moved to the first relative positions. An electrical conductor has an electrical connection with the electrical lead. The electrical connection is provided by melted portions of the electrical lead and the electrical conductor that are bonded together.

BRIEF DESCRIPTION OF THE DRAWINGS

The foregoing and other features of the present invention will become apparent to one skilled in the art to which the present invention relates upon reading the following description of the invention with reference to the accompanying drawings, in which:

FIG. 1 is an isometric view of a vehicle occupant protection system in accordance with the present invention;

FIG. 2 is a schematic sectional view of parts of the system of FIG. 1;

FIGS. 3 and 4 are views similar to FIG. 2 showing parts in different positions;

DESCRIPTION OF PREFERRED EMBODIMENT

Figure 4:
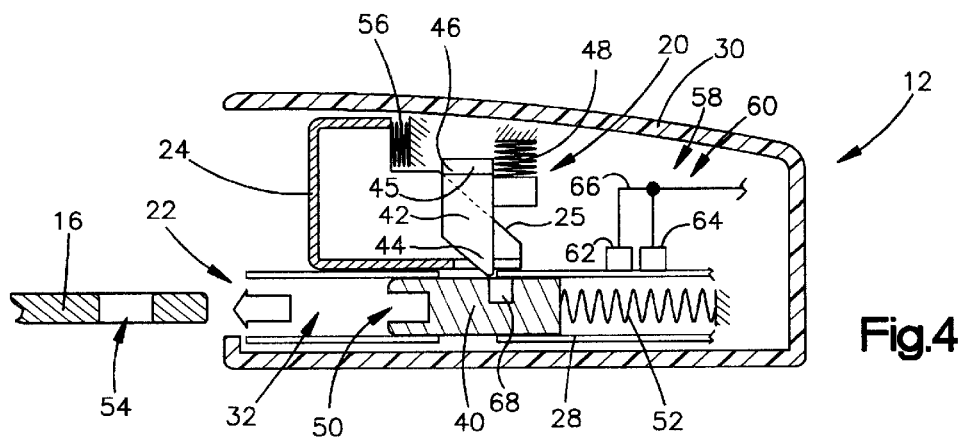

A vehicle occupant protection system 10 is shown in FIG. 1. The system 10 includes a seat belt buckle 12, seat belt webbing 14, and a seat belt tongue 16 on the webbing 14. The buckle 12 is anchored in a vehicle in a known manner, such as by a cable or anchor strap (not shown) extending within a cover 18. A latch mechanism 20 (shown schematically in FIGS. 2–4) locks the seat belt tongue 16 in the buckle 12 when the seat belt tongue 16 is inserted into the buckle 12 through an opening 22 at the end of the buckle 12. The seat belt tongue 16 is subsequently released from the buckle 12 upon depression of a pushbutton 24 adjacent to the opening 22.

As shown in FIGS. 2–4, the buckle 12 includes a base 28 disposed within a housing 30. The base 28 supports the latch mechanism 20 within the housing 30, and defines a passage 32 that receives the seat belt tongue 16.

The latch mechanism 20 may comprise any suitable structure capable of releasably interlocking with the seat belt tongue 16. As shown by way of example in FIGS. 2–4, the latch mechanism 20 has a plurality of known parts including the pushbutton 24, an ejector 40, and a latch 42.

The latch 42 is movable between a non-locking position (FIG. 2) and a locking position (FIG. 3). A latch spring 48 engages the latch 42 and biases it toward the passage 32. The ejector 40 holds the latch 42 in the non-locking position against the bias of the latch spring 48.

When the seat belt tongue 16 is inserted into the opening 22, as indicated by the arrow shown in FIG. 2, it is moved into engagement with the ejector 40 in a notch 50 at the end of the ejector 40. The seat belt tongue 16 is then moved inward against the ejector 40 so as to push the ejector 40 along the passage 32 from a forward position (FIG. 2) to a rearward position (FIG. 3) against the bias of an ejector spring 52.

As the seat belt tongue 16 and the ejector 40 approach the positions of FIG. 3, an aperture 54 in the seat belt tongue 16 moves into alignment with the latch 42. The latch spring 48 then moves the latch 42 downward to the locking position through the aperture 54 in the seat belt tongue 16 so that a first end portion 44 of the latch 42 blocks removal of the seat belt tongue 16 from the buckle 12.

When the seat belt tongue 16 is to be released from the buckle 12, the pushbutton 24 is moved from the position of FIG. 3 to the position of FIG. 4 against the bias of a pushbutton spring 56. As illustrated in FIGS. 2–4, the pushbutton 24 includes a cam surface 25 that engages with flanges 45 located at the second end portion 46 of the latch 42 to move the latch 42 out of the aperture 54 in the seat belt tongue 16 against the bias of the latch spring 48. The ejector spring 52 then moves the ejector 40 outward along the passage 32 toward the opening 22 to eject the seat belt tongue 16 from the buckle 12 as shown by the arrow in FIG. 4.

The buckle 12 includes a sensor 58 that comprises electrical components, indicated generally at 60, for detecting when the seat belt tongue 16 is locked in the buckle. The electrical components 60 are supported on the base 28, within the housing 30, by known means, such as an adhesive. As illustrated in FIGS. 2–4, the electrical components 60 include a Hall effect device 62, a capacitor 64, and a cable 66. A magnet 68 is supported by, and movable with, the ejector 40. The magnet 68 and the Hall effect device 62 are thus movable relative to each other. The magnet 68 is preferably insert molded or press fitted into the ejector 40.

Figure 5:
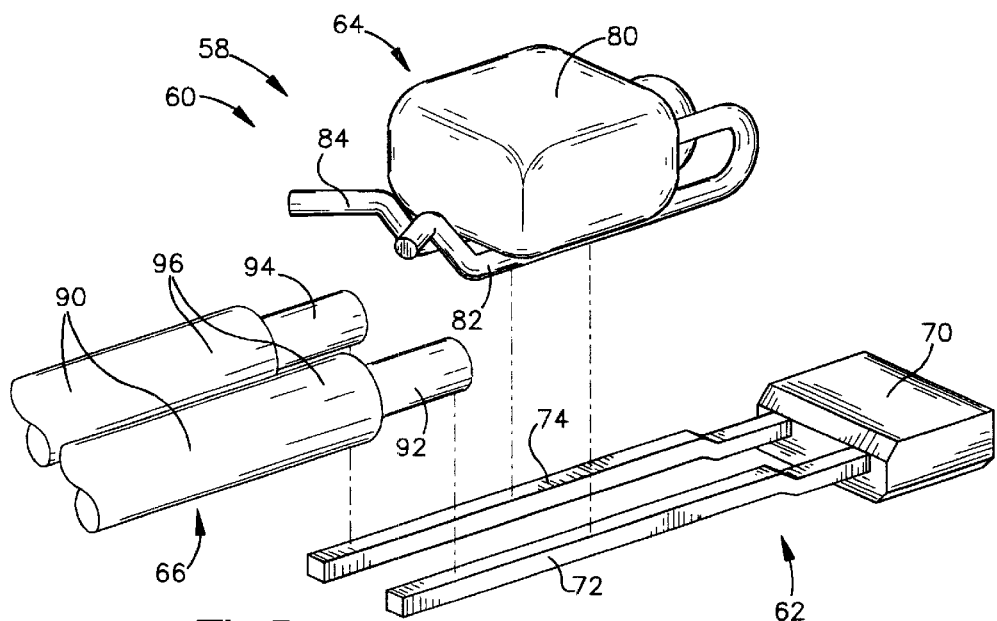
FIG. 5 is an exploded isometric view of parts of the system of FIG. 1.
Figure 6:
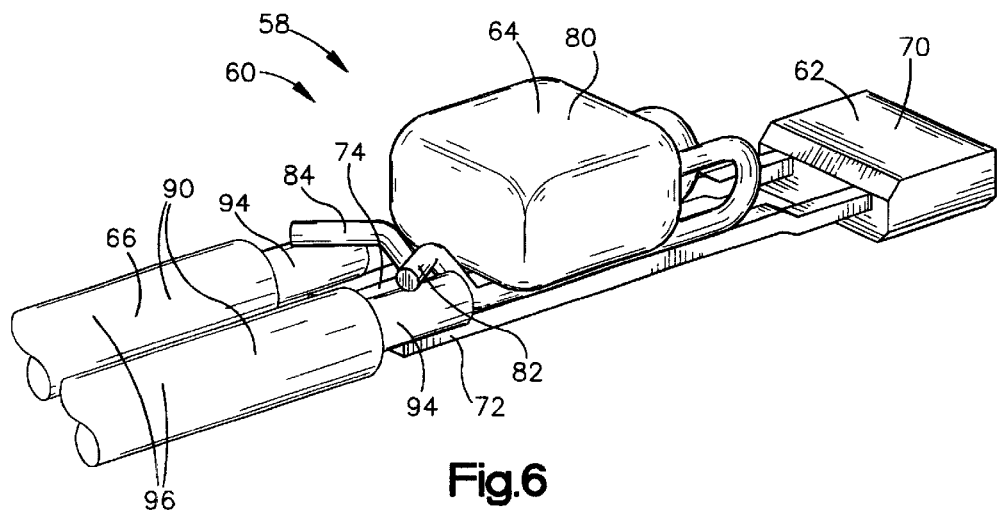
FIG. 6 is an isometric view of the parts shown in FIG. 5, showing the parts in different positions.
Figure 7:
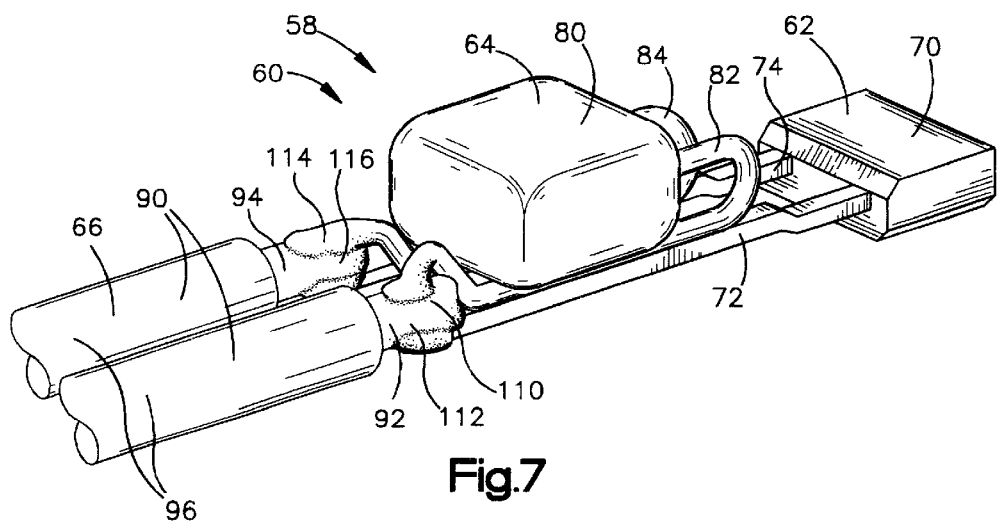
FIG. 7 is an isometric view of the parts of FIG. 6 showing the parts electrically connected.

Referring now to FIGS. 5–7, the Hall effect device 62 comprises an integrated circuit 70 that is typically encapsulated in a material, such as a ceramic or polymeric material. The Hall effect device 62 includes first and second electrical leads 72 and 74 that extend from the integrated circuit 70. The capacitor 64 includes a body portion 80 and first and second electrical leads 82 and 84 that extend from the body portion. The cable 66 comprises a pair of wires 90 that includes first and second electrical conductors 92 and 94 surrounded by insulating material 96. The electrical leads 72, 74, 82, and 84, and the electrical conductors 92 and 94 are constructed of a metal, such as copper, tin, or an alloy thereof.

In accordance with the present invention, the electrical components 60, i.e., the Hall effect device 62, the capacitor 64, and the cable 66, are electrically connected by resistance welding. This eliminates the need for separate connecting means, such as solder, terminals, or other like separate connectors. Advantageously, this may also help to reduce the amount of time required to assemble the sensor 58, the complexity of the manufacturing process used to assemble the sensor, and the cost of assembling the sensor.

In the illustrated embodiment, the first electrical leads 72 and 82 are electrically connected to the first electrical conductor 92, and the second electrical leads 74 and 84 are electrically connected to the second electrical conductor 94. The means by which the first electrical leads 72 and 82 are electrically connected to the first electrical conductor 92 is identical to the means by which the second electrical leads 74 and 84 are electrically connected to the second electrical conductor 94. Therefore, only the means by which the first electrical leads 72 and 82 are electrically connected to the first electrical conductor 92 will be discussed in detail below.

In order electrically to connect the components 60 of the sensor 58 by resistance weld, the first electrical leads 72 and 82 are placed in physical contact with the first electrical conductor 92. This is illustrated in FIG. 6. Heat and pressure are then applied to the first electrical leads 72 and 82 and the first electrical conductor 92. The heat and pressure may be applied simultaneously. The heat is generated by applying a voltage across the first electrical leads 72 and 82 and the first electrical conductor 92. Portions 110 (FIG. 7) of the first electrical leads 72 and 82 and the first electrical conductor 92 are melted by the heat applied via the voltage. The melted portions 110 are combined together to form a bond, which creates an electrical connection, indicated generally at 112, between the first electrical leads 72 and 82 and the first electrical conductor 92. In an identical manner, an electrical connection, indicated generally at 114, is created by melted portions 116 of the second electrical leads 74 and 84 and the second electrical conductor 94.

Those skilled in the art will recognize that the sensor 58 may have alternative configurations. For example, the sensor 58 may omit the capacitor 64 and include only the Hall effect device 62 and the cable 66. The sensor 58 may also include electrical components 60 other than, or in addition to, the Hall effect device 62, capacitor 64 and cable 66. Also, the electrical components 60 of the sensor 58 may be arranged in different positions relative to each other.

When the tongue 16 is not received in the buckle 12, the latch 42 is in the non-locking position of FIG. 2. When the latch 42 is in the non-locking position, the ejector 40, and thus the magnet 68, are spaced away from the sensor 58. In the non-locking position, the magnet 68 creates a magnetic field of a first flux density that acts on the Hall effect device 62. As a result, the Hall effect device 62 has a first output that corresponds to sensing the magnetic field of a first flux density when the buckle 12 is in the non-locking position. This indicates that the tongue 16 is not received in the buckle 12. The first output is transmitted via the cable 66.

When the tongue 16 is received in the buckle 12, the latch 42 is in the locking position of FIG. 4. When the latch 42 is in the locking position, the ejector 40 is spaced close to or adjacent the sensor 58. The magnet 68 and the Hall effect device 62 are thus in first relative positions when the tongue 16 is received in the buckle 12. Therefore, in the locking position, the magnet 68 creates a magnetic field of a second flux density that acts on the Hall effect device 62. As a result, the Hall effect device 62 has a second output that corresponds to sensing the magnetic field of a second flux density, when the buckle 12 is in the non-locking position. This indicates that the tongue 16 has been received in the buckle 12. The second output is transmitted via the cable 66.

Thus, Hall effect device 62 senses a first flux density of the magnetic field when the latch 42 is in the non-locking position (FIG. 2). The Hall effect device 62 senses a second flux density of the magnetic field, different than the first flux density, when the latch 42 is in the locking position (FIG. 3). As a result, the Hall effect device 62 is switched from a first condition with a first output to a second, different condition with a correspondingly different output upon locking of the seat belt tongue 16 in the buckle 12 by the latch 42.

Those skilled in the art will recognize that the seat belt buckle 12 may have alternative configurations in which different conditions are sensed by the sensor 58 in order to determine when the latch 42 is in the locking position. For example, the sensor 58 and the magnet 68 may be positioned such that the locking condition is sensed when the latch 42 is in the position of FIG. 3 or when the seat belt tongue 16 is in the position of FIG. 3. Also, the sensor 58 and/or the magnet 68 may be connected to different parts of the buckle 12. For example, sensor 58 and/or the magnet 68 may be connected to the housing 30, latch 42, or ejector 40.

The sensor 58 can be used to alert a vehicle occupant to the locked or unlocked condition of the seat belt tongue 16 and buckle 12. For example, an audible alarm or a lamp on the vehicle instrument panel could be activated in response to the output of the Hall effect device 62 to alert a vehicle occupant if the seat belt tongue 16 is not locked in the buckle 12.

The sensor 58 can also be used to control one or more vehicle occupant protection devices. For example, the sensor 58 can be included in a deployment system with an inflatable vehicle occupant protection device. The sensor 58 can be used to control the inflation of the protection device depending upon the buckled or unbuckled condition of the seat belt. The inflatable device can be any one of several different types of inflatable vehicle occupant protection devices known in the art. Such inflatable devices include air bags, inflatable seat belts, inflatable knee bolsters, inflatable head liners, and knee bolsters operated by air bags.

From the above description of the invention, those skilled in the art will perceive improvements, changes and modifications. For example, although the present invention has been described as providing an electrical connection for electrical components in a seat belt buckle, the present invention may be used to provide an electrical connection for electrical components in other vehicle occupant protection systems. Examples of such alternative uses may be in sensors, switches, or actuators in seat belt retractors or pretensioners. Other alternative uses may be in vehicle seat position or occupant weight sensors. Such improvements, changes and modifications within the skill of the art are intended to be covered by the appended claims.

Having described the invention, the following is claimed:

1. A vehicle occupant protection system comprising:
a seat belt buckle for receiving a seat belt tongue;
a Hall effect device mounted on said seat belt buckle, said Hall effect device having at least one electrical lead;
a magnet mounted on said seat belt buckle, said magnet and said Hall effect device being moveable relative to each other to first relative positions upon receipt of said seat belt tongue in said seat belt buckle, said Hall effect device providing a signal in response to said magnet and said Hall effect device being moved to said first relative positions; and
an electrical conductor having an electrical connection with said electrical lead, said electrical connection being provided by melted portions of said at least one electrical lead and said electrical conductor that are bonded together.

2. The vehicle occupant protection system of claim 1, wherein said electrical connection is formed by resistance welding said portions of said electrical conductor to said portions of said at least one electrical lead.

3. The vehicle occupant protection system of claim 1, wherein said electrical conductor comprises a wire.

4. A vehicle occupant protection system comprising:
a vehicle occupant protection device having a base part;
at least one electrical component mounted on said base part, each of said at least one electrical component having at least one electrical lead;
an electrical conductor having an electrical connection with said at least one electrical lead, said electrical connection being provided by melted portions of said at least one electrical lead and said electrical conductor that are bonded together,
said vehicle occupant protection device further comprising a seat belt buckle for receiving a seat belt tongue and said at least one electrical component further comprising a Hall effect device mounted on said seat belt buckle, said electrical connection electrically connecting said Hall effect device to said electrical conductor.

5. The vehicle occupant protection system of claim 4, further comprising a magnet mounted on said seat belt buckle, said magnet and said Hall effect device being moveable relative to each other to first relative positions upon receipt of said seat belt tongue in said seat belt buckle, said Hall effect device providing a signal in response to said magnet and said Hall effect device being moved to said first relative positions.

6. A vehicle occupant protection system comprising:
a vehicle occupant protection device having a base part;
at least one electrical component mounted on said base part, each of said at least one electrical component having at least one electrical lead;
an electrical conductor having an electrical connection with said at least one electrical lead, said electrical connection being provided by melted portions of said at least one electrical lead and said electrical conductor that are bonded together,
said vehicle occupant protection device further comprising a seat belt buckle for receiving a seat belt tongue and said at least one electrical component further comprising a Hall effect device mounted on said seat belt buckle and a capacitor mounted on said seat belt buckle, said electrical connection electrically connecting said Hall effect device and said capacitor to said electrical conductor.

7. The vehicle occupant protection system of claim 6, further comprising a magnet mounted on said seat belt buckle, said magnet and said Hall effect device being moveable relative to each other to first relative positions upon receipt of said seat belt tongue in said seat belt buckle, said Hall effect device providing a signal in response to said magnet and said Hall effect device being moved to said first relative positions.

\* \* \* \* \*